Sept. 29, 1931. J. M. GRIBBIE 1,824,991
LOCK WASHER
Filed Sept. 9, 1929
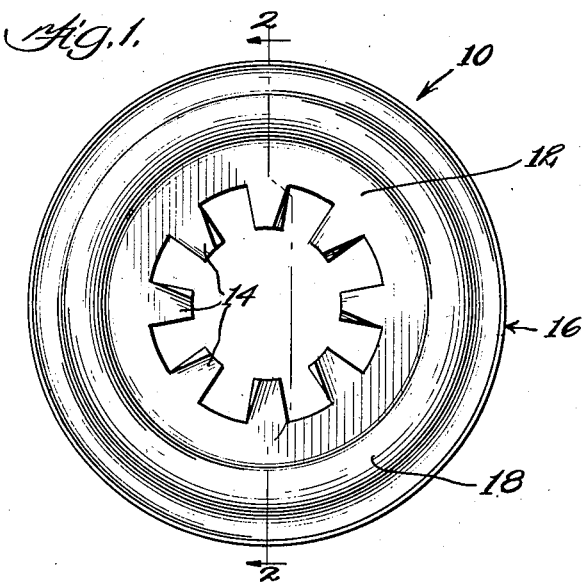
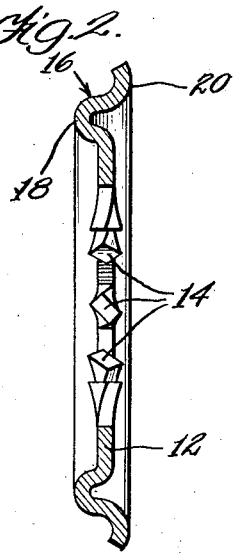
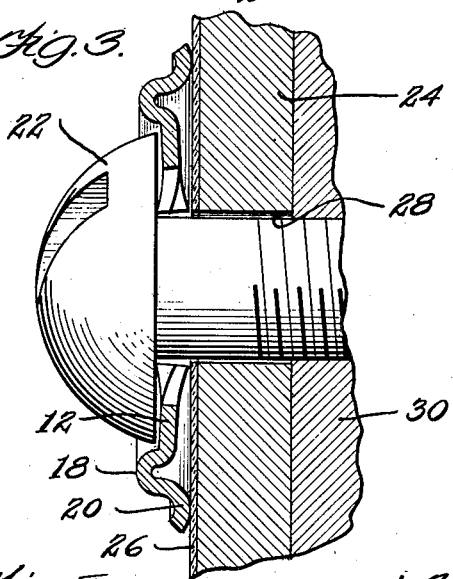
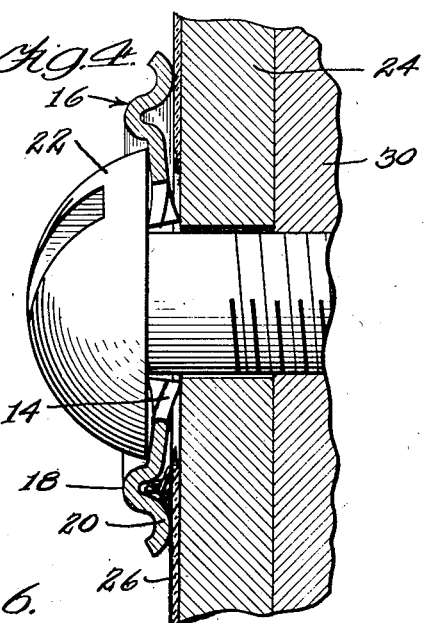
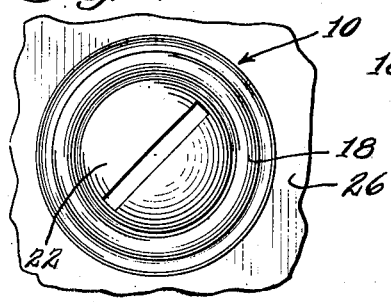
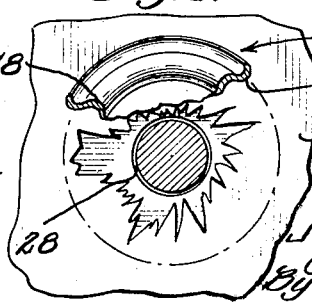
Inventor:
John M. Gribbie
By Oliver, Cox & Moore
ATT'YS Patented Sept. 29, 1931

1,824,991

UNITED STATES PATENT OFFICE

JOHN M. GRIBBIE, OF CHICAGO, ILLINOIS, ASSIGNOR TO SHAKEPROOF LOCK WASHER COMPANY, OF CHICAGO, ILLINOIS, A CORPORATION OF DELAWARE

LOCK-WASHER

Application filed September 9, 1929. Serial No. 391,162.

My invention relates generally to lock washers and more particularly to lock washers for use on enameled surfaces and the like.

In applying twisted tooth types of lock washers such as the type shown in the patent to Hosking No. 1,419,564 upon enameled surfaces, it has been found in some instances that the teeth or prongs cause the enamel coating to crack and chip. Obviously, if these cracks or chipped portions extend beyond the outer margin of the washer an unsightly surface area is presented and this is partciularly objectionable in instances where the enameled surface is in plain view of the user as for example the front enameled surfaces of gas ranges and structures of like nature.

It is one of the primary objects of my invention to provide a lock washer of improved practical construction which is designed to positively prevent the development of the above mentioned unsightly surface disfigurement.

More specifically, it is an object of my present invention to provide a lock washer having an annular portion which is adapted to bear against the surface coating and thereby prevent cracks and chipped areas from extending beyond the outer margin of the washer.

It is a still further object of my invention to provide a twisted tooth lock washer having a section which is adapted to resiliently bear against an annular surface portion of the work as a screw head or nut is clamped against the teeth of said washer.

Still more specifically, my invention contemplates the provision of a lock washer which may be conveniently stamped or otherwise formed from flat stock which lock washer is provided with a plurality of internal work engaging teeth and an annular resilient section extending out of the plane of said teeth which is adapted to be clamped against the surface of the work.

These and other objects and advantages will be more apparent from the following detailed description when considered in connection with the accompanying drawings, wherein:

Figure 1 is an elevational view of a lock washer embodying features of my invention;

Figure 2 is a central transverse sectional view taken substantially along the line 2—2 of Figure 1;

Figure 3 discloses the washer in operative association with an enameled surface, the head of the screw being tightened against the washer teeth sufficiently to cause the resilient marginal portion of the washer to bear against the enameled surface without effecting the engagement of the washer teeth with the enameled surface;

Figure 4 is a view similar to Figure 3 disclosing the screw head clamped against the washer in such a manner as to effect the engagement of the washer teeth with the enameled surface;

Figure 5 is an elevational view of the structure as viewed from the left of Figure 4; and Figure 6 is a view similar to Figure 5 with a portion of the washer structure and screw head removed to disclose the manner in which said washer prevents cracks and chipped portions of the enameled surface from extending beyond the annular margin thereof.

Referring now to the drawings more in detail wherein I have employed like numerals to designate similar parts throughout the various figures, it will be seen that one embodiment of my invention resides in the provision of a lock washer which I have designated generally by the numeral 10. This lock washer may be stamped or otherwise formed from suitable flat spring stock and includes an annular body portion 12. Spaced along the inner edge of the body portion 12 is a plurality of locking teeth or prongs 14 which are twisted out of the plane of the body portion so as to present sharp corners for lockingly engaging the work. Formed integral with and extending outwardly from the body portion 12 is a resilient marginal section which I have designated generally by the numeral 16. This marginal section includes a ridge 18 which extends out of the plane of the body portion toward the screw receiving side thereof and a ridge or corrugation 20 which extends out of the plane of the body portion as well as out of the plane which includes the work engaging corners of the teeth 14 as clearly shown in Figure 2.

The above described lock washer is particularly adaptable for use in instances where it is necessary to secure a screw head or nut in position upon an enameled surface or any surface having a coating which has a tendency to chip or crack. The application of the washer to a coated surface is clearly shown in Figures 3 to 6 inclusive. In these figures I have disclosed the washer positioned between a screw head 22 and a plate or member 24 having a coating 26. The screw extends through an aperture 28 in the plane 24 and is tightened within a member 30, the action of the screw being such as to cause the washer to be clamped between the screw head 22 and the coating 26.

Referring particularly to Figure 3, it will be seen that the screw head 22 has been tightened against the outermost corners of the teeth or prongs 14 so as to cause the annular rib or corrugation 20 to bear against the surface coating 26. The innermost corners of the prongs 14 are not in engagement with the coating 26 and therefore said coating is free from cracks and the like which would be experienced if the screw head were clamped against the washer teeth as shown in Figure 4. Thus, in Figure 3, I have shown the manner in which my improved lock washer may be used in instances where the co-operation between the locking engagement of the washer teeth with the screw head and the frictional engagement of the resilient marginal section 16 of the washer with the surface coating is sufficient to prevent the screw from loosening. In other words, the frictional engagement of the rib 20 with the surface coating is sufficient to preclude the necessity of bringing the inner corners of the washer prongs into engagement with said surface coating.

By applying additional tightening force to the screw head 22, the innermost corners of the washer teeth are carried into locking engagement with the plate 24. Obviously, the engagement of these sharp tooth corners with the surface coating 26 has a tendency to cause said coating to crack and chip as shown in Figure 6. The resilient clamping action of the rib or corrugation 20 against the surface coating is sufficient to positively prevent said cracks or chipped portions from extending beyond the marginal confines of the washer. In this way any disfigurement of the coating which takes place during the tightening of the washer will be completely concealed by said washer. Thus, in tightening the screw head against the washer the outer flange or annular ridge 20 presses against the coated or enameled surface, before the twisted teeth come into contact with said surface, thereby arresting the cracks in the enamel caused by said teeth to the extent that any cracks which may be formed will be confined within said annular flange.

From the foregoing it will be apparent that my invention contemplates the provision of a lock washer of extremely simple construction which is particularly adaptable for use with screws and the like employed in connection with enameled surfaces. Such surfaces are frequently employed in connection with gas ranges, refrigerators and the like and my improved lock washer is particularly adapted for such surfaces to positively prevent surface disfigurements from extending beyond the confines of the washer. The surface engaging portion of the ridge or flange 20 is such as to preclude the possibility of surface cracking when said ridge is resiliently clamped against the work. The inherent resiliency of the marginal section of the washer effectively co-operates with the tightening action of the screw head in clamping the rib 20 against the surface coating. As already set forth above, the frictional resistance between the ridge 20 and the surface coating is sufficient in some instances to secure the screw head in position without the necessity of clamping the innermost sharp corners of the prongs against the enameled surface. In addition to providing the desired resiliency in the marginal section 16, the ridge or rib 18 presents a very neat appearing protective housing for the margin of the screw head. The recess presented within the confines of the rib 18 presents a socket for receiving the screw head and it will be apparent from Figure 5 that the external appearance of the lock washer and associated screw head is very pleasing and in fact ornate. In other words, the structural characteristics of the washer not only render said washer efficiently operable as a locking device but also render said washer attractive in external appearance when operatively associated with the work.

Having thus described my invention, what I claim as new and desire to secure by Letters Patent is:

In a lock washer of the class described comprised of flat stock, an annular body portion having a plurality of internal work engaging teeth and a resilient marginal section including an annular flange extending out of the plane of the body portion in one direction and an annular flange coextensive therewith extending out of the plane of the body portion in the opposite direction, the space presented within one of said annular flanges being adapted to receive a clamping member.

In witness whereof, I have hereunto subscribed my name.

JOHN M. GRIBBIE.